United States Patent [19]

Dreyfoos, Jr.

[11] 3,724,954

[45] Apr. 3, 1973

[54] LOGARITHMIC CIRCUIT WITH AUTOMATIC COMPENSATION FOR VARIATIONS IN CONDITIONS OF OPERATIONS

[75] Inventor: Alex W. Dreyfoos, Jr., Palm Beach, Fla.

[73] Assignee: Photo Electronics Corporation, West Palm Beach, Fla.

[22] Filed: Jan. 14, 1972

[21] Appl. No.: 217,775

[52] U.S. Cl. ..................356/175, 250/226, 324/105, 324/115, 324/130, 328/145, 355/38, 356/188, 356/202, 356/223, 356/226

[51] Int. Cl. .........G01j 3/46, G06g 7/24, G03b 27/78

[58] Field of Search......356/175, 184, 186, 188, 189, 356/190, 202, 223, 224, 226, 227; 355/38; 250/226; 324/74, 105, 115, 130, 132; 178/5.2 A; 307/230; 328/142, 145

[56] References Cited

UNITED STATES PATENTS

| | | | |
|---|---|---|---|
| 3,448,289 | 6/1969 | Harris | 328/145 |
| 3,528,749 | 9/1970 | Bowker | 356/202 |
| 3,237,028 | 2/1966 | Gibbons | 324/132 |
| 3,560,757 | 2/1971 | Pugsley | 250/226 |
| 3,653,759 | 4/1972 | Klein | 356/175 |

*Primary Examiner*—Ronald L. Wibert
*Assistant Examiner*—V. P. McGraw
*Attorney*—Curtis Ailes

[57] ABSTRACT

An amplifier is connected in combination with a logarithmic function electrical device to compensate the operation of the combination by adjustment of a bias on the amplifier and by adjustment of the gain of the amplifier to provide a true logarithmic function despite variations in conditions of operation.

39 Claims, 8 Drawing Figures

LOGARITHMIC CIRCUIT WITH AUTOMATIC COMPENSATION FOR VARIATIONS IN CONDITIONS OF OPERATIONS

This invention relates to improved logarithmic apparatus, and more particularly to an improved logarithmic circuit apparatus which provides a greatly improved accuracy and reproducibility despite fluctuations in long time constant conditions of operation of the apparatus.

Semiconductor junction devices have been known for some time as being capable of providing a voltage which is a logarithmic function of a device current. Silicon semiconductor junction devices are especially favored for this purpose because they provide a logarithmic output voltage function over a much wider range of input currents than do semiconductor devices formed with other semiconductor materials. However, one of the major problems in the use of such devices as logarithmic function generators is that the operation of the devices varies substantially dependent upon conditions of operation, such as temperature. Generally, as used herein, the term "operating conditions" refers to conditions (other than the input signal) which vary at a rate which is slower than a sampling rate of the system. The sampling rate may also be referred to as a recalibration rate. The meaning of these terms will be more apparent from the following disclosure. However, in order to provide a clearer definition for this term, in one preferred embodiment of the invention, the sampling and recalibration occurs at a recurrence rate of 800 times per minute. This is not to say that the term "operating conditions" is necessarily limited to conditions which change at a rate slower than 800 times per minute.

Accordingly, it is one object of the present invention to provide an improved logarithmic circuit apparatus.

Another object of the invention is to provide an improved logarithmic circuit apparatus which is virtually completely compensated for changes in operating conditions such as temperature, thus avoiding the necessity for controlling such operating conditions within extremely narrow ranges.

Another object of the present invention is to provide a logarithmic circuit apparatus which is particularly useful for obtaining electrical voltage output signals which represent logarithmic functions of the intensity of optical input signals.

Another object of the invention is to provide an improved high accuracy photometer.

Another object of the invention is to provide a three color photometer which provides accurate and simultaneous measurements of three colors.

Another object of the invention is to provide a photometer apparatus in combination with an analog computer which is capable of measuring the spectral content and distribution of spectral illumination available in a photographic color print machine for the purpose of adjusting the color filters and the exposure time to provide a color print having predetermined desired qualities. This is referred to hereinafter as a color translator.

Another object of the invention is to provide an improved, high accuracy, direct reading three color photographic densitometer.

Further objects and advantages of the invention will be apparent from the following description and the accompanying drawings.

In carrying out the invention there is provided a circuit operable to provide an output signal which is an accurate logarithmic function of an input signal despite fluctuations in conditions of operation comprising an electrical device capable of providing an intermediate output signal which is a logarithmic function of an input signal and which is subject to modification in response to variations in at least one condition of operation. The circuit includes means operable in timed sequence to repeatedly present first and second different known standard input signals and an unknown input signal to said electrical device, and a first amplifier connected to receive the intermediate output signals from said electrical device to amplify said logarithmic function intermediate output signals to produce output signals. There is provided means connected to receive the output of said first amplifier in response to said first standard input signal and operable for adjusting a bias on the input of said first amplifier in accordance therewith, and means connected to receive the output of said first amplifier in response to said second standard input signal and operable for adjusting the gain of said first amplifier in accordance therewith, said bias adjusting means and said gain adjusting means being effective to compensate the operation of the combination of said electrical device and said first amplifier to provide a true logarithmic function output signal in response to the unknown input signal within the effective logarthmic function input signal range of said electrical device despite variations in said conditions of operation.

Figure 3:
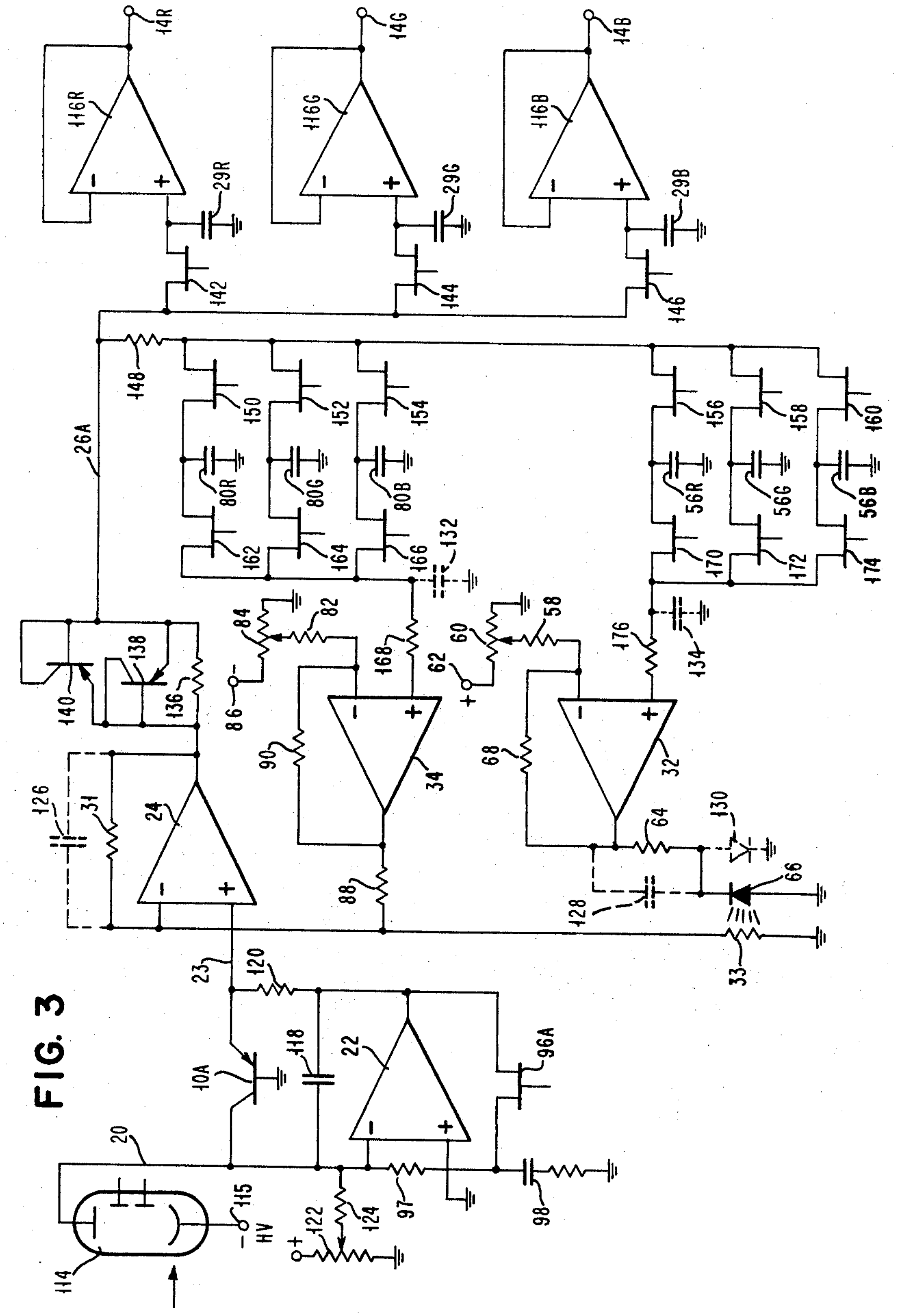
FIG. 3 is a schematic circuit diagram illustrating a portion of an alternative embodiment of the invention in which the input signals are in the form of illumination signals.
Figure 8:
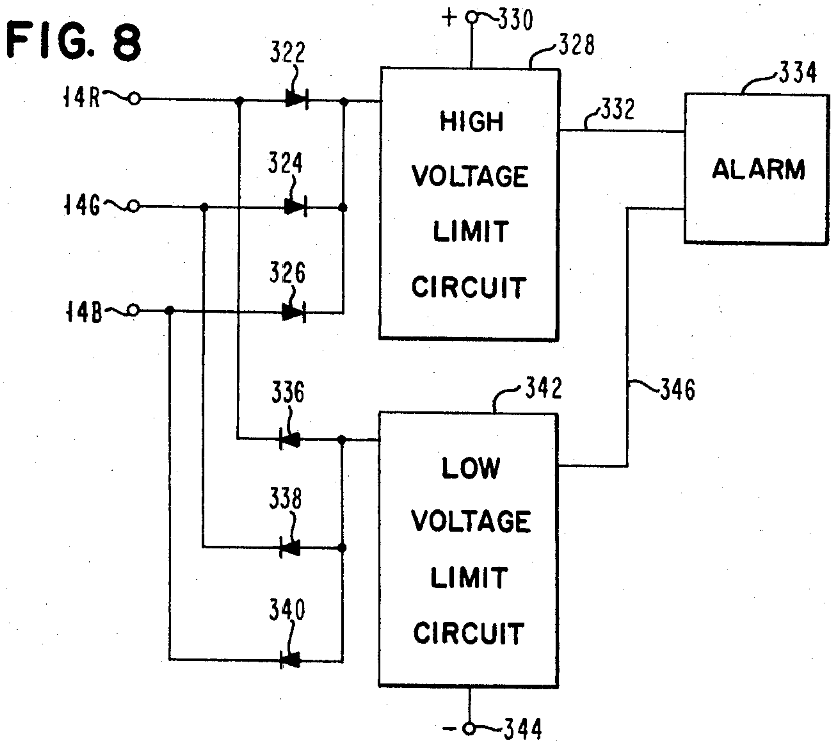
Figure 7:
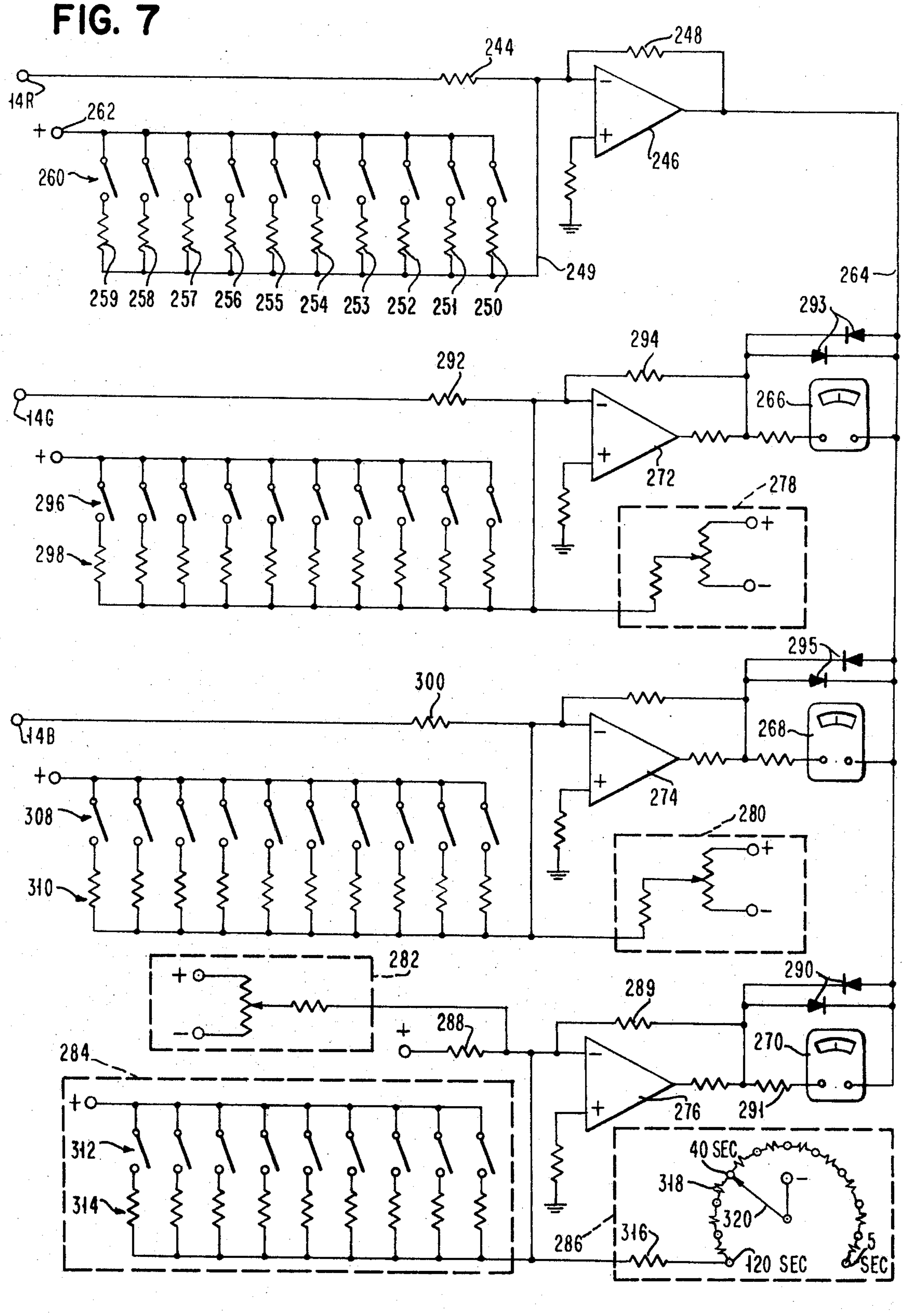

FIG. 7 illustrates a circuit which may be connected to the output terminals of the circuit of FIG. 3 to form a combination circuit which provides a comparison of the color output signals to derive photometer readings, and which may also be used as a color translator system for determining the proper color filters and exposure time to be used in color photographic print production apparatus. And, FIG. 8 illustrates an auxiliary circuit which is preferably provided at the outputs of the circuit of FIG. 3 to indicate to the operator when the circuit of FIG. 3 is being operated outside of the true logarithmic range.

Figure 1:
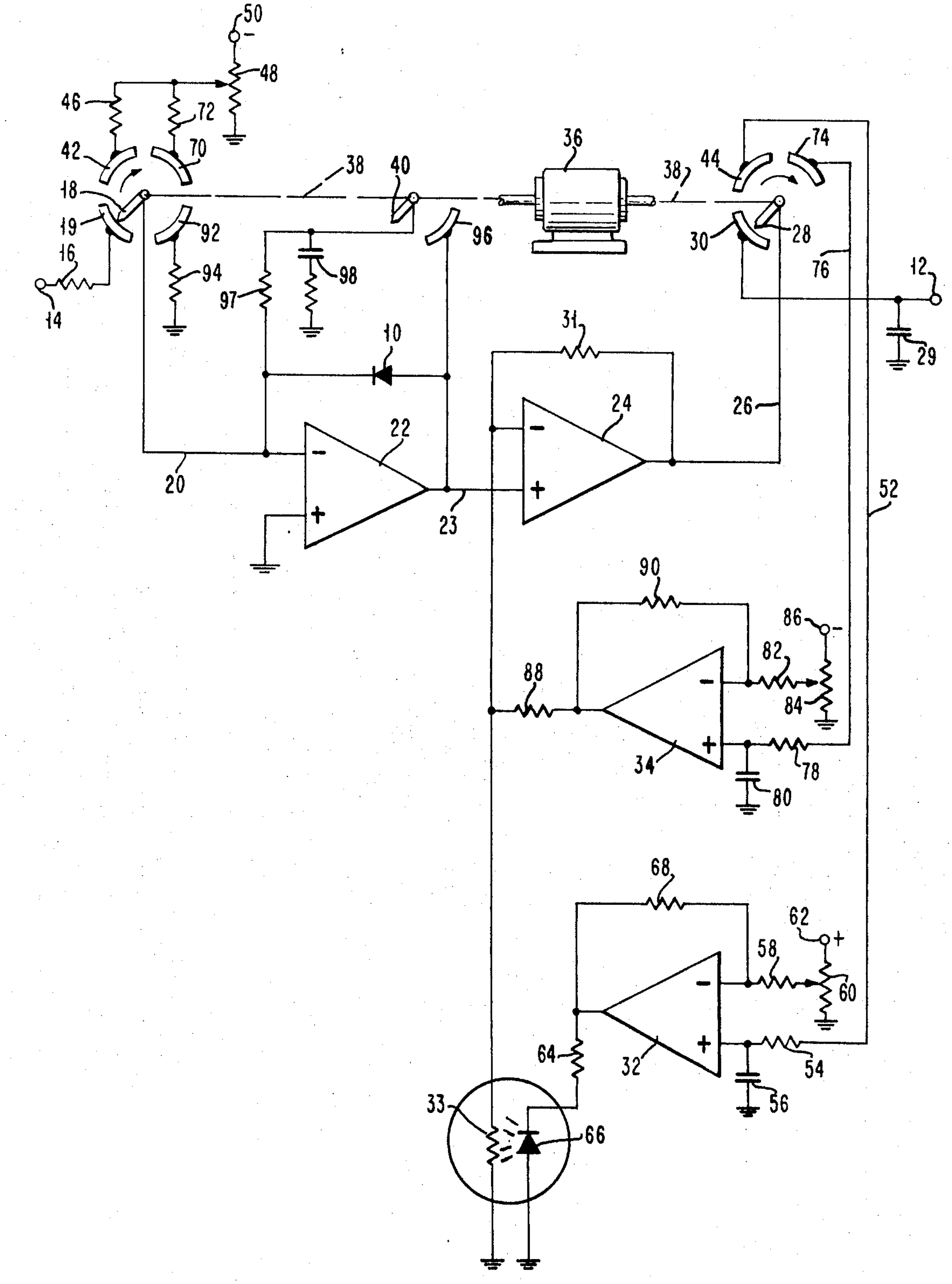
FIG. 1 is a schematic circuit diagram illustrating one preferred form of the invention.

Referring more particularly to FIG. 1 of the drawings, the circuit includes a diode element 10 which has the intrinsic property that the voltage across this circuit element is a logarithmic function of the current through the element. The present circuit makes use of this property to provide a voltage output at terminal 12 which is a logarithmic function of an input signal at terminal 14. In addition to the diode 10, the circuit between the input terminal 14 and the output terminal 12 includes a current limiting resistor 16, a commutator switch 18 through a contact 19, a connection 20 to the diode 10 and to an operational amplifier 22. Amplifier 22 has its inverting input connected to one side of the diode 10, and its output connected to the other side of the diode 10 and also to the non-inverting input of a second operational amplifier 24. The output of operational amplifier 24 is connected at 26 through a second commutating switch 28 and a contact 30 to the output terminal 12. The voltage output on terminal 12 is stored on capacitor 29. Operational amplifier 24 is connected in the non-inverting mode with resistors 31 and 33 forming a voltage divider from the output to ground, and with the inverting input connected to this voltage divider.

As the system is illustrated in FIG. 1, it is anticipated that the input signal at terminal 14 will be at a DC level below ground, so that, following the usual conventions, there will be a flow of current through connection 20 away from the inverting input of the operational amplifier 22. It is the characteristic of the operational amplifier 22, when connected in the manner shown, to adjust its output in response to an input signal to attempt to maintain the voltage across its two input terminals at essentially zero value. In the present instance, this means maintaining the inverting input at connection 20 at substantially ground potential. This means that there must not be any current flow through the inverting input of the operational amplifier to connection 20. Thus, the output of the operational amplifier must adjust so that all of the current from connection 20 required at the input terminal 14 is supplied through the diode 10. This means that the output of the operational amplifier 22 must go positive with respect to ground sufficient to supply the voltage drop across the diode 10 so that the current through the diode 10 will be equal to the input current. Since the diode 10 has the inherent characteristic that the voltage across the diode is a logarithmic function of the current through the diode, this means that the voltage above ground at the output 23 of the operational amplifier 22 is a logarithmic function of the input current at input terminal 14. This output voltage signal at connection 23 may be referred to as an intermediate output signal since it is further amplified in the operational amplifier 24.

The diode 10 is preferably a semi-conductor junction device, and preferably one in which the semi-conductor is silicon. It has been found that silicon diodes provide a logarithmic function over a wider operating range than devices employing other semi-conductor materials. It is possible also to obtain a similar result employing a transistor, preferably a silicon transistor, in place of the diode 10 as will be explained more fully below.

One of the most serious disadvantages with these logarithmic devices is that the output characteristics are extremely sensitive to conditions of operation. The most serious operating condition of this nature is temperature. Thus, a temperature variation of only a few degrees will seriously modify the output signal so that successive outputs resulting from successive inputs will not bear a continuing logarithmic relationship. The temperature changes not only cause a change in the level of the voltage output for a given input value, but the temperature change also changes the slope of the output characteristic with respect to the input signal values. To overcome these problems, in accordance with the present invention, the absolute level of the output of the circuit is adjusted and readjusted by means of an operational amplifier 34 which is connected to provide a variable bias on the amplifier 24. Furthermore, the slope characteristic is readjusted in rapidly recurring intervals by means of an operational amplifier 32 connected to adjust the gain of the operational amplifier 24. The input signals for the amplifiers 32 and 34 are obtained through the operation of the commutator switches 18 and 28 which are constantly rotated, such as by an electric motor 36, through the shaft schematically indicated at 38. A further commutator switch 40 is rotated by shaft 38 for another purpose explained further below. The motor 36 is preferably a synchronous motor so that the operations of the commutating switches 18, 28, and 40 are synchronized with the power system.

When the motor has rotated one quarter of a turn beyond the position shown, the commutator switch arm 18 is in contact with a new commutator switch segment 42, and the commutator arm 28 is in contact with a new switch segment 44. The time period when this occurs is sometimes referred to below as the first sampling period. Commutator switch segment 42 is connected through a resistor 46 and a potentiometer 48 to a reference source of current indicated by terminal 50. This provides a current at input connection 20 for the diode 10 and the operational amplifier 22 which corresponds to a known input signal.

At the same time, the output from operational amplifier 24 resulting from this new and known input sample to the diode 10 is supplied through the connection 26, the commutator switch 28, the switch segment 44 and a connection 52 to a resistor 54 for storage on a capacitor 56. Capacitor 56 serves to store the voltage value supplied through connection 52 from one sampling period to the next, and to provide a continuing input to the non-inverting input connection of the operational amplifier 32. The voltage on capacitor 56 is compared with an adjustable standard voltage applied to the inverting input of amplifier 32 through a resistor 58 and a potentiometer 60 from a standard voltage source indicated by the terminal 62. The resultant output from the operational amplifier 32 is supplied through a load resistor 64 to a light emitting diode 66. A feedback resistor 68 is connected across the inverting input and the output of the operational amplifier 32. The amplifier 32 is thus connected in the "differential gain" mode such that the output is a function of the non-inverting input minus a function of the inverting input.

The resistor 33 associated with the light emitting diode 66 is a photoconductor which may be composed of a photoconductive material such as cadmium sulfide. Devices embodying such a combination of a photoconductor and a light emitting diode are available commercially as prefabricated unitary devices. The illumination resulting from the current in diode 66 transmitted to the photoconductor 33 decreases the resistance of photoconductor 33 and thus increases the gain of the operational amplifier 24. This adjustment in the gain of the operational amplifier 24 effectively changes the slope of the logarithmic output function provided at terminal 12 from the combined circuit. As is well known for operational amplifiers connected as shown for amplifier 24, the gain is proportional to the sum of the resistance values of resistors 31 and 33 divided by the resistance value of resistor 33. Thus, any decrease in the value of resistance 33 causes the gain to increase. While variable resistance devices other than the combination of the photoconductor 33 and the photodiode 66 could be employed, a device of this type is preferred. It is particularly advantageous in the present circuit because of the complete absence of any electrical or electromagnetic coupling between the circuit of the diode 66 and the circuit of the resistor 33. Thus, the only coupling is by means of light radiated from the photodiode 66 to photoconductor 33 and there is no possibility of back coupling from photoconductor 33 to the diode 66.

Alternatively, a similar result can be obtained by using a photoconductor for resistor 31 with an optical coupling to photodiode 66.

When the motor 36 is rotated another one-quarter of a turn (one full half turn beyond the position shown), the commutator switch arm 18 is in contact with a new commutator switch segment 70. The period when this occurs is referred to as the second sampling period. Commutator switch segment 70 is connected through a resistor 72 and the potentiometer 48 to the reference source of current indicated by terminal 50. This provides a current at input connection 20 for the diode 10 and the operational amplifier 22 which corresponds to a known input signal which is different from the input signal available through commutator segment 42.

At the same time, the output from operational amplifier 24 resulting from this new known input sample signal to the diode 10 is supplied through the connection 26, the commutator switch 28, and a switch segment 74 and a connection 76 to a resistor 78 for storage on a capacitor 80. Capacitor 80 serves to store the voltage value supplied through connection 76 from one sampling period to the next, and to provide a continuing input to the non-inverting input connection of the operational amplifier 34. The voltage on capacitor 80 is compared with an adjustable standard voltage applied to the inverting input of amplifier 34 through a resistor 82 and a potentiometer 84 from a standard voltage source indicated by the terminal 86. The output from the operational amplifier 34 is connected through a load resistor 88 to the inverting input of the operational amplifier 24. Thus, the output of the operational amplifier 34 changes the DC bias voltage level on the inverting input of the operational amplifier 24. This adjusts the direct current voltage output level of the entire circuit at terminal 12 for the known input from the standard input source 50 supplied through potentiometer 48, and through resistor 72. The variable bias on operational amplifier 34 may be adjusted at potentiometer 84 so that amplifier 34 provides the correct bias to the operational amplifier 24. A feedback resistor 90 is connected around the operational amplifier 34 to the inverting input. Thus, amplifier 34 is connected in the "differential gain" mode such that the output is a function of the non-inverting input minus a function of the inverting input.

The standard input signals provided from source 50 through the respective resistors 46 and 72 to the respective amplifiers 32 and 34 are preferably substantially different so as to define and standardize two different points on the logarithmic voltage output curve of the apparatus. By standardizing at two different points, and by adjusting for both DC bias and for the slope of the output characteristic, the output is maintained substantially independent of fluctuations in operating conditions such as temperature.

In the operation of amplifier 34, suppose there is an increase in the absolute value of voltage available from the combination of the diode 10 and the operational amplifier 22 for a known input. Thus, in the operation of operational amplifier 34, an increase in the voltage stored on capacitor 80 above the value with which it is compared and which is available at potentiometer 84 causes the DC level of the output of operational amplifier 34 to rise. This puts a more positive DC bias on the inverting input of the operational amplifier 24, shifting the DC level of the output of amplifier 24 downwardly to appropriately compensate the combination of the circuit including the operational amplifier 24, the diode 10, and the operational amplifier 22.

With respect to the operation of amplifier 32, the adjustment of potentiometer 60 is essentially to a voltage corresponding to the correct voltage which should be stored on capacitor 56 in response to operation of the amplifier 24 resulting from an input from the standard represented by resistor 46. Thus, if an operating condition of the diode 10, such as temperature, changes so as to change the output of amplifier 24 upwardly in response to the standard input through resistor 46, then the comparison with the voltage from potentiometer 60 at operational amplifier 32 causes the output of amplifier 32 to go up, increasing the current in diode 66, increasing the illumination on photoconductor 33, thus decreasing the resistance of photoconductor 33 and increasing the gain of operational amplifier 24. This is the correct and desired operation because an upward change in the absolute value of the output corresponds to a decrease in temperature. However, a decrease in temperature results in a decrease in the gain of the overall circuit. Thus, for a given change in input current, there is a smaller change in output voltage at a lower temperature than there is at a higher temperature. Therefore, an increase in the gain of operational amplifier 24 compensates for the decrease in the gain of the combination of diode 10 and operational amplifier 22 in response to the decrease in temperature.

Thus, it is to be seen that the adjustable bias provided at potentiometer 84 generally corresponds to the output expected from the operational amplifier 24 during the second sampling period when the standard sample is supplied through resistor 72 while the bias voltage supplied through potentiometer 60 corresponds to the output expected from operational amplifier 24 during the first sampling period when the standard sample is supplied through resistor 46.

Furthermore, since the voltage stored on capacitors 56 and 80 carry over and continue to control the operations of the amplifiers 32 and 34 during the entire sampling cycle of operation, the operations of amplifiers 32 and 34 are necessarily interdependent. Thus, the voltage stored on capacitor 56 and the resulting operation of operational amplifier 32 and control of the gain of amplifier 24 is effective during the second sampling period when a new sample is being stored on capacitor 80 to control the bias of operational amplifier 24. Similarly, the voltage stored on capacitor 80 continues to control the bias on operational amplifier 24 during the storage of a new sample voltage on capacitor 56 for the control of gain of amplifier 24. The circuits associated with amplifiers 32 and 34 may be characterized as feedback control circuits since they operate in response to the output of the operational amplifier 24 to adjust the input of that amplifier and to thereby compensate the operation of the entire circuit for changes in operating conditions such as temperature.

Figure 2:
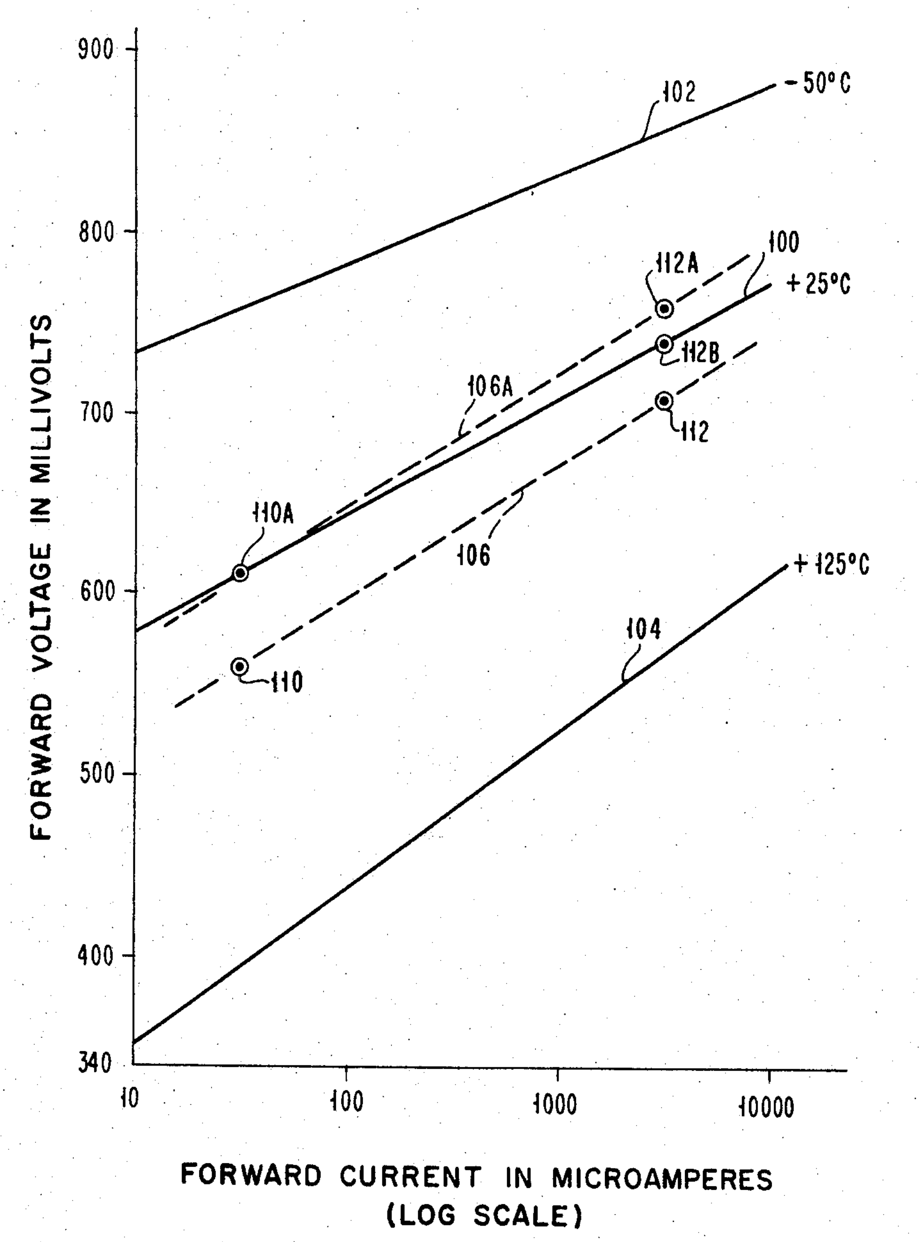
FIG. 2 is a curve sheet showing the logarithmic function provided by the diode employed in the invention, and illustrating the function and operation of the embodiment of the invention illustrated in FIG. 1.

FIG. 2 illustrates the deviations of the logarithmic output characteristic of a silicon diode in response to changes in temperature, one of the most important operating conditions for this device. Thus, in FIG. 2, curve 100 illustrates the output characteristic at 25°C expressed in terms of the forward voltage in millivolts (the ordinant plotted on a linear scale) versus the forward current of the diode in microamperes (the abscissa plotted on a logarithmic scale). Curve 102 illustrates how this diode characteristic is changed for a temperature of minus 50°C. The absolute level of the voltage output is shifted upwardly, but the slope is reduced. Conversely, curve 104 shows the change encountered upon an increase in temperature to 125°C. The absolute level of the output is shifted downwardly, but the slope of the curve is increased.

The operation of the circuit of FIG. 1, as described thus far, is further illustrated by the dotted curves 106 and 106A in FIG. 2. Let us assume that the operating temperature of the diode 10 in FIG. 1 is increased substantially so that the resultant output voltage curve is as illustrated by the dotted curve 106, having an absolute shift downwardly, and an increase in the slope with respect to the curve 100. It is desired to have the system operate as if the diode maintained the characteristic curve 100 regardless of changes in temperature. If the known input current in FIG. 1 supplied through resistor 72 during the second sampling period is 30 microamperes, this will correspond to point 110 on the shifted curve 106. The resultant operation of amplifier 34 will cause a shift in the bias of the operational amplifier 24 so as to shift the point 110 upwardly to point 110A, thus carrying the entire curve 106 upwardly to the position indicated at 106A. Thus, the general level of the curve 106 is corrected so that it coincides with the curve 100, at point 110A.

Next, the standard current signal supplied through resistor 46 in FIG. 1 during the first sampling period (in the following sampling cycle) is 3,000 microamperes, corresponding to point 112. The upward bias shift of the curve 106 to 106A carries the point 112 up to the point 112A. The operation of the amplifier 32 in response to the standard signal supplied during the first sampling period is then effective to shift the slope of the output of operational amplifier 24 so as to bring the point 112A to the position indicated at 112B. This necessarily rotates the curve 106A so that the entire curve substantially coincides with the desired curve 100. Thus, both the level and the slope of the incorrect curve 106 are corrected to coincide with the desired curve 100.

It will be understood that the above explanation is over-simplified. The curves are all corrected in the operational amplifier 24. Accordingly, it is the output of the amplifier 24 which is corrected, rather than the output from the diode 10. Thus, the output from the amplifier 24 is corrected in such a manner that it consistently appears that the diode characteristic coincides with the curve 100, while the uncorrected diode output corresponding to curve 106 is actually supplied from diode 10 and amplifier 22 to the operational amplifier 24.

Referring again to FIG. 1, when the motor rotates another quarter of a turn (three-quarters of a turn from the position shown in the drawing), the commutator switch 18 connects to a zero input segment 92 connected through a resistor 94 to ground. This occurs during the third sampling period. This provides a basis for a zero input bias adjustment on the operational amplifier 22. During this third sample period, the commutating switch 40 makes contact with a segment 96 and thereby provides a feedback connection from the output of the operational amplifier 22 to the inverting input of that amplifier through a resistor 97. This provides a zero input bias current to the operational amplifier 22. Thus, if the voltage at the output connection 23 of the operational amplifier 22 varies from a zero value with respect to ground in response to the zero value input supplied through resistor 94, then that output voltage is fed back in a negative feedback mode to the inverting input of the operational amplifier 22. This supplies a bias current to the inverting input of the operational amplifier 22 to reduce the output voltage at connection 23 to more closely approximate zero value. Thus, this feedback loop, which is in parallel with the diode 10, tends to constantly recalibrate the zero output characteristic of the operational amplifier 22. This calibration effect is carried over through the entire sampling cycle by means of a capacitor 98 connected to be charged with the operational amplifier output voltage at connection 23 during the zero calibration sampling period while commutating switch segment 96 is closed. Thus, during the remainder of the sampling cycle, the charge current on capacitor 98 is available to leak off through resistor 97 to supply the zero bias current requirements of the operational amplifier 22.

The diode 10 of FIG. 1 may be replaced by a transistor having a grounded base, with the collector of the transistor connected to the inverting input of amplifier 22 and the emitter connected to the output connection 23 of amplifier 22. Such an arrangement is illustrated by a transistor 10A in FIG. 3. A transistor connected in this manner is referred to as a transdiode since it provides a logarithmic function output just as does the diode 10 of FIG. 1. A silicon transistor is preferred because it provides a larger logarithmic function range. It is a characteristic of the transistor that the emitter-to-base voltage is a logarithmic function of the collector to base current. Thus, by employing a transistor 10A connected as shown in FIG. 3, the output voltage at connection 23 (the transistor emitter voltage) is a logarithmic function of the input current at connection 20 (the collector current). The operational amplifier 22 in FIG. 3 achieves the same basic mode of operation as in FIG. 1. Thus, the output voltage of the operational amplifier 22 shifts in such a way as to control the operational amplifier input to maintain that input at a minimum current value. This means that the output voltage of the operational amplifier 22 is applied to the transistor emitter to control the transistor so as to cause the transistor collector to provide substantially the entire input current for connection 20.

While the circuit mechanism is somewhat different for the diode 10 and the transistor 10A, they provide the same basic function and they are sometimes generically referred to hereinafter as semiconductor devices or as diodes. Thus, the term "diode" is defined herein to include the term transdiode.

The transdiode circuit including the transistor 10A is preferred in the circuits of the present invention because it has a somewhat greater logarithmic characteristic current-voltage range than does the simple diode. However, it will be understood that either the simple diode 10 or the transdiode transistor 10A may be employed in the embodiment of FIG. 1, and likewise either device may be employed in the circuit of FIG. 3 which is to be described in more detail below.

FIG. 3 illustrates another embodiment of the invention in which the input signals may be in the form of optical illumination signals supplied to a photomultiplier tube 114 as indicated by the arrow. The two standard signals for the calibration operation of the amplifiers 32 and 34 are provided by supplying standard illumination intensity signals to the photomultiplier tube 114, and the unknown signals are also illumination signals directed to the photomultiplier tube 114. Furthermore, the zero input calibration signal is obtained by blocking all illumination to the photomultiplier tube 114. An optical shuttering disc is preferably provided which is rotated by a motor for the purpose of gating the different optical signals in sequence to the photomultiplier tube 114. This optical shuttering arrangement will be described more fully below in connection with FIGS. 4 and 5. Suitable circuit switching signals are also supplied in synchronism with the optical gating by the same gating apparatus.

Because the combination of the transdiode 10A and the photomultiplier tube 114 provide output signals which are a logarithmic function of optical input signals, these two devices may be collectively referred to on some occasions below as constituting an "electrical device" capable of providing an intermediate output signal which is a logarithmic function of an input signal. The intermediate output signal is, of course, the signal on connection 23.

Since the circuit of FIG. 3 is arranged to receive optical illumination signals and to provide output signals at output terminals 14R, 14G, and 14B which are logarithmic functions of the input signals, the circuit of FIG. 3 may be referred to as a photometer. In the preferred form of the invention, the optical gating arrangements interposed between the light sources and the photomultiplier tube 114 include color filters so that the apparatus is capable of measuring illumination in several different colors in sequence. However, the sampling operation of the apparatus is typically quite rapid so that the apparatus is capable of constantly detecting and re-detecting the unknown signals in three different colors, the outputs being stored and available for all colors simultaneously. Thus, the output terminals 14R, 14G, and 14B signify respectively photometer measurements for red, green, and blue. The voltage signals signifying the photometer readings for the different colors are stored on the capacitors respectively designated 29R, 29G, and 29B. The associated operational amplifiers 116R, 116G, and 116B are respectively connected to the capacitors in the known "voltage follower" mode to provide an output voltage proportional to the capacitor charge voltage, and capable of supplying a substantial current without dissipating the capacitor charge.

The photomultiplier tube 114 has its anode connected to the input connection 20 and its cathode connected at 116 to a high voltage negative polarity source. Thus, in the conventional sense, the input current flows from the connection 20 to the plate of the photomultiplier tube 114. All of this current is supplied from the collector of transistor 10A. In this transdiode circuit, a capacitor 118 is connected across the amplifier, and a resistor 120 is connected in series with the emitter to enhance the stability of the feedback loop formed by the transistor 10A across the amplifier 22.

As in the embodiment of FIG. 1, the FIG. 3 embodiment includes a zero input stabilizing circuit including a switching device 96A connected in a feedback loop including a resistor 97 and a capacitor 98 to provide a zero input bias current for the operational amplifier 22. The switching device 96A consists of a metal-oxide semi-conductor (MOS) device which is closed during the zero input sampling period. In the FIG. 3 embodiment, this constitutes a period when no light is supplied to the photomultiplier tube 114. Thus, this zero input biasing circuit, including the switching device 96A and the resistor 97, not only compensates for zero input current to the amplifier 22 caused by imperfections in that amplifier, but it also compensates for any zero illumination current present in the photomultiplier tube 114. A manual bias adjustment for this circuit may also be provided by means of a potentiometer 122 and a resistor 124.

The operational amplifier 24 is connected in FIG. 3, just as it was in FIG. 1, with the associated operational amplifiers 34 and 32. A capacitor 126 is preferably added across the feedback resistor 31 of amplifier 24 to promote stability. Similarly, a capacitor 128 may be connected across the load resistor 64 of amplifier 32 for the promotion of stability. Furthermore, in order to limit the back voltage on the photodiode 66, a diode 130 may optionally be connected in parallel with the photodiode and in opposite polarity. Stabilizing capacitors may also be provided, as shown at 132 and 134, on the non-inverting inputs of the amplifiers 34 and 32. These capacitors hold the amplifier inputs steady during commutation, such as the commutation from one storage capacitor 80R to another storage capacitor 80G by gating devices 162 and 164. All of these last mentioned five elements are shown dotted since they are optional refinements to the circuit.

One of the basic functions of the output of the operational amplifier 24 is to charge the output signal storage capacitors 29R, 29G, and 29B, and also to charge the calibration capacitors 80R, 80G, 80B, and 56R, 56G, and 56B. At the output of the operational amplifier 24 there is preferably provided a variable time constant circuit consisting of a resistor 136 and transistors 138 and 140. The circuit including resistor 136 and transistors 138 and 140 is referred to as a variable time constant circuit because it is a variable impedance circuit which varies the capacitor charge change rate for the above mentioned capacitors. Thus resistor 136 may be, for instance, in the order of 10,000 ohms. However, if there has been a drastic change in a particular input signal from one sampling period to the next, then the charge change current through resistor 136 will be high enough to cause a voltage drop of at least a few tenths of a volt. This will be sufficient to commence substantial conduction in the base-emitter circuit of one of the transistors 138 or 140, thus providing a low impedance shunt circuit around the resistor 136 and substantially lowering the charge time constant for the particular capacitor being charged at that moment. After the charge is changed, so that it is in substantial coincidence with the measured value, subsequent sampling signals with the same optical input will result in a much smaller current output from amplifier 24 which will not cause substantial conduction in either of the transistors 138 or 140. Thus, the resistor 136 is fully effective to shift the circuit to a long time constant circuit. The short time constant afforded by the transistors 138 and 140 is desirable in order to enable the circuit to rapidly adjust to new conditions. However, once the new conditions are substantially accommodated, it is desirable to have a long time constant to minimize small transient fluctuations in the output and in order to minimize random "noise" signals which otherwise tend to be troublesome. This permits the photomultiplier 114 to be operated at relatively low light levels which might otherwise lead to circuit instability problems.

Beyond the variable time constant circuit, the output from amplifier 24 is supplied through connection 26A through gating devices 142, 144, and 146 to the respective capacitors 29R, 29G, and 29B and thus to the output terminals 14R, 14G, and 14B. The switching devices 142, 144, and 146 are MOS devices which are switched in appropriate sequence to detect the unknown color signal photometer outputs from amplifier 24.

Because the circuit of FIG. 3 compensates not only for variations in the operating conditions of the transdiode 10A, but also for variations in the operating conditions of the photomultiplier tube 114, the circuit is set up with compensating control capacitors 80R, 80G, 80B, and 56R, 56G, and 56B for separately and independently compensating and controlling operational amplifier 24 for each of the three colors. This is desirable because the response of the photomultiplier tube 114 is different for optical signals in the different colors. All of the signals to the above mentioned capacitors are supplied through a common resistor 148 and switched in the required sequence to the respective capacitors by MOS switching devices 150, 152, 154, 156, 158, and 160. The resultant voltage signals stored on the capacitors 80R, G, and B are supplied to amplifier 34 through MOS gating devices 162, 164, and 166 and a resistor 168. Similarly, the voltages from capacitors 56R, G, and B, are supplied to amplifier 32 through gating MOS devices 170, 172, and 174 and a resistor 176.

Figure 4:
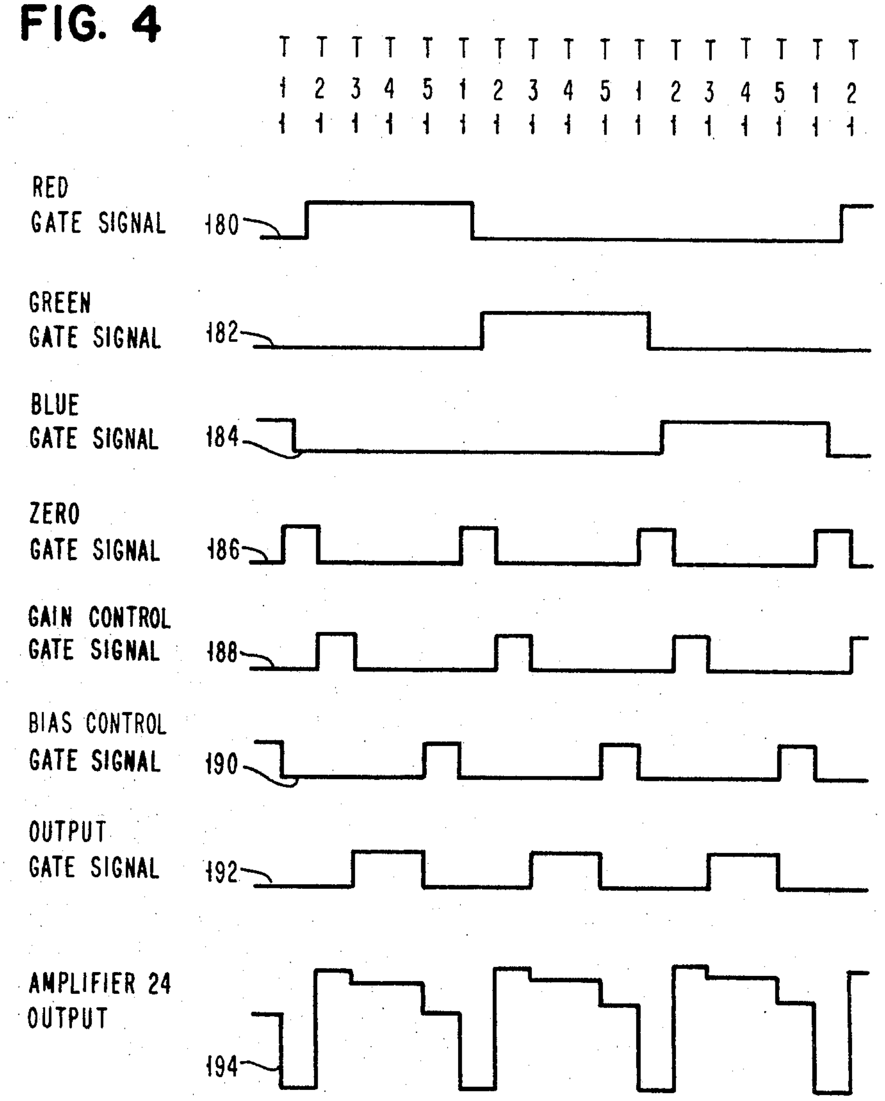
FIG. 4 is a timing diagram illustrating the mode of operation of that portion of the system illustrated in FIG. 3.

The detailed operation of FIG. 3 is described in conjunction with the timing diagram shown in FIG. 4 in which various timing and gating signals are illustrated.

FIG. 4 is a timing diagram illustrating a complete cycle of the operation of the system of FIG. 3 and illustrating the timing relationships of the various gating signals controlling the circuit of FIG. 3. The starting points of the repeating time intervals are identified at the top of the diagram as T1, T2, etc. Between time T1 and T2, the red gate signal illustrated by curve 180 comes on. The interval represented by this red gate signal coincides with the presentation of a red color filter to intercept all of the light presented to the photomultiplier tube 114. The red gate signal directly controls the MOS gates 162 and 170 to respectively connect the capacitors 80R and 56R to control the inputs of the operational amplifiers 34 and 32. These gates remain closed during the entire red gate signal. The red gate signal continues on until the interval between the second T1 and T2 times when the red gate signal goes off and the green gate signal (curve 182) comes on. A green color filter then intercepts all of the light to photomultiplier 114. MOS gates 164 and 172 are then gated on, instead of gates 162 and 170, to connect the respective capacitors 80G and 56G to control amplifiers 34 and 32. This continues until the next succeeding interval between times T1 and T2 when the green gate signal goes off and the blue gate signal (curve 184) comes on to open the capacitor gates 166 and 174 to make the capacitors 80B and 56B effective to control the amplifiers 34 and 32. During this blue interval, a blue filter intercepts the light to photomultiplier 114. Thus, the entire circuit operates in successive phases to deal with red, green, and blue input signals, and with continuous recalibration in each color, the individual color recalibrations being remembered by means of the charges stored upon the capacitors 80R, G, and B, and 56R, G, and B.

The transition from one color signal to another (curves 180, 182, and 184), and the concurrent shifts from one color filter to another, are accomplished during each successive period from T1 to T2, and this is the interval of the zero gate signal illustrated in curve 186. The zero gate signal gates on the MOS device 96A in FIG. 3 to constantly revise and recalibrate the circuit for the zero illumination input condition. During these zero gate signal times, there is a complete interruption of illumination to the photomultiplier tube 114.

During each interval from T2 to T3, the gain control gate signal shown in curve 188 is on. This signal controls the gates 156, 158, and 160 to apply charge change currents and voltages to the capacitors 56R, G, and B. Gate 156 is turned on only during the first T2 to T3 interval when there is a coincidence of the red gate signal (curve 180) and the gain control gate signal (curve 188). Similarly, gate 158 is on only during coincidence of the green gate signal (curve 182) and the gain control gate signal (curve 188). Gate 160 is turned on only during coincidence of the blue gate signal (curve 184) and the gain control gate signal (curve 188).

In a similar manner, the bias control gate signals (curve 190) serve during the T5 to T1 time intervals to successively gate on the gating devices 150, 152, and 154 when the successive bias control gate signals are coincident with the red, green, and blue gate signals (curves 180, 182, and 184). Thus, the 80R capacitor, for instance, is connected through gate 150 to the output of operational amplifier 24 only during coincidence of the red gate signal and the bias control gate signal. The presentation of the gain control gate signals (curve 188) and the bias control gate signals (curve 190) coincides with the presentation of standard gain control and bias control illumination signals to the photomultiplier tube 114.

Similarly, when the unknown illumination signals are presented to the photomultiplier tube 114, an output gate signal (curve 192) is available. This occurs during the time intervals T3 to T5. During those intervals, the gates 142, 144, and 146 are actuated respectively when coincident with the red, green, and blue gate signals (curves 180, 182, and 184) to provide the unknown output signals to capacitors 29R, G, and B and output terminals 14R, G, and B.

To provide a further understanding of the invention, an idealized representation of the output of amplifier 24 is presented in curve 194 through all of the timing intervals illustrated in FIG. 4. As shown in curve 194, the standard input signal for gain control is at a relatively high level and the standard input signal for bias control is at a relatively low level. However, these relationships can be reversed if desired. The most important point is that these two standard signals should be widely different in magnitude so as to provide calibration based upon the fixing of two different points as described above in connection with FIG. 2.

The order of switching for gain control, bias control, output gate signals and zero gate signals is changed in FIG. 3 from the order used in FIG. 1. This illustrates that since the recalibration occurs in a continuously repeating cycle, no particular specific order of timing is absolutely essential in the practice of the invention. However, it is believed to be very desirable to provide the transition from one color to another during the zero gate signal interval since no color information is required during that interval.

Figure 5:
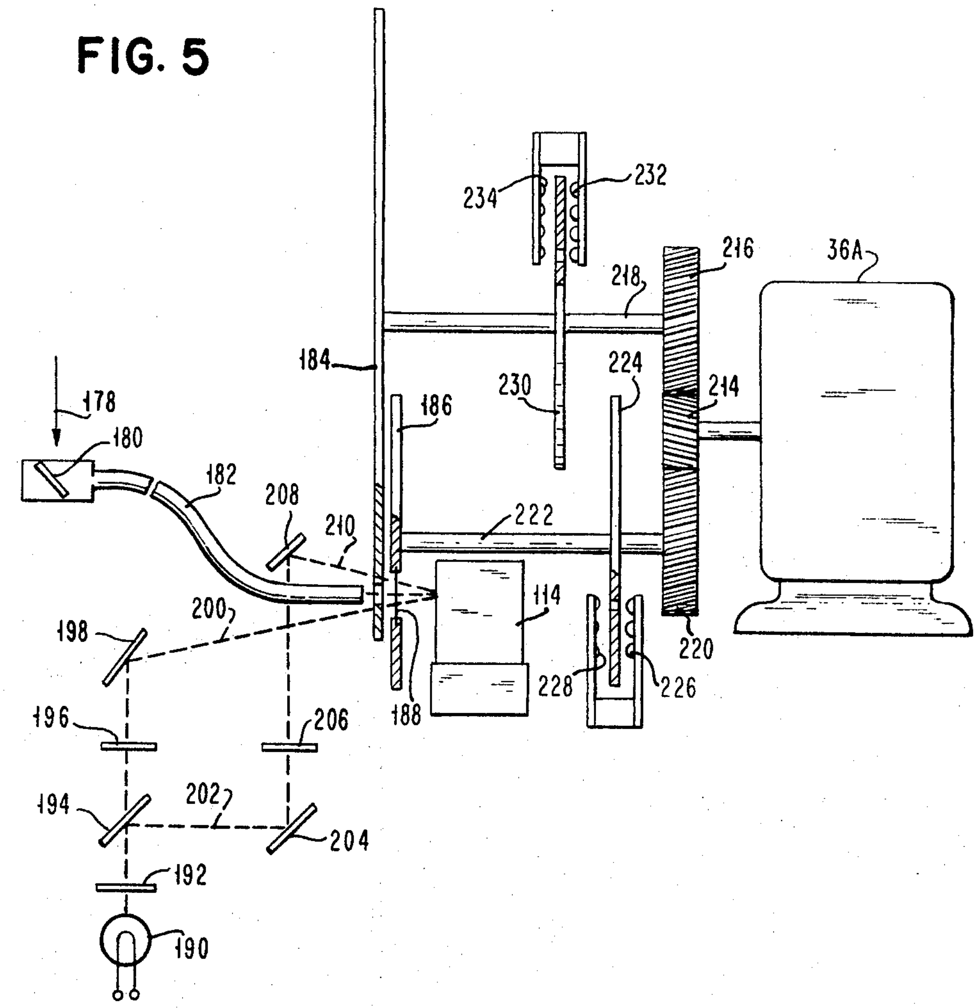
FIG. 5 is a side view, partially in section, of mechanical components of the system of FIG. 4.

FIG. 5 is a schematic representation of the optical and mechanical elements associated with the circuit of FIG. 3 for controlling the delivery of light to the photomultiplier tube 114, and for generating the gating signals discussed above in connection with FIG. 4. The unknown illumination, which is indicated by arrow 178, may be delivered to the photomultiplier tube 114 from a mirror 180, through a fiber optics light pipe 182, through an aperture disc 184, and through a light filter 188 which comprises part of a filter disc 186. The discs 184 and 186 are shown partially in section.

The standard calibration optical signals are preferably provided from a simple incandescent lamp 190 operated at a regulated voltage which is well below its rated voltage. It has been found that under these operating conditions, an incandescent lamp provides a very consistent and unvarying amount of illumination which is suitable for calibration purposes. The light from lamp 190 is passed through a filter 192 and through a piece of glass 194 and a second filter 196 from which it is reflected from a mirror 198 and thereby directed at 200 through aperture disc 184 and color filter 188 to the photomultiplier tube 114. The light is shuttered on and off at the proper intervals by the aperture disc 184. The aperture for this light beam is not illustrated in the drawing. This light beam is the high intensity reference beam which is employed to control the gain as previously explained in connection with FIG. 3.

A small portion of the light from lamp 190 impinging upon the glass 194 is reflected at 202 and transmitted by reflector 204 through filter 206 and thus from reflector 208 as indicated at 210 through discs 184 and 186 to the photomultiplier tube 114. The reflector 204 is preferably a simple piece of glass, rather than a prism or a mirror. Accordingly, it actually reflects only about 8 or 10 percent of the impinging light, the remainder being lost in a non-reflective optically black enclosure (not shown). Because of the fractional reflections from 194 and 204, the light intensity in beam 210 is reduced to approximately 1 percent of the intensity of beam 200. An exact ratio of one percent is preferred. To obtain the exact ratio, trimming filters 196 and 206 are provided.

The aperture disc 184 and the filter disc 186 are preferably driven in a synchronized manner in a common gear train from a synchronous motor 36A. The gear train includes a pinion gear 214 on the motor shaft which drives a spur gear 216 to thereby drive the shaft 218 of the aperture disc 184. The pinion gear 214 also engages a spur gear 220, driving the shaft 222 of the filter disc 186. The color gate signals (shown in curves 180, 182, and 184 in FIG. 4) are preferably generated by a timing aperture disc 224 mounted upon the filter disc shaft 222 and therefore necessarily rotating in perfect synchronism therewith. To obtain the necessary electrical gating signals in response to the passage of the apertures in the timing disc 224, light emitting diodes 226 are provided on one side of the disc with phototransistors 228 respectively mounted on the opposite side of the disc and operable to respond whenever the illumination from the associated light emitting diode 226 reaches the phototransistor through the associated timing aperture in the timing disc 224.

Similarly, an aperture timing disc 230 is provided on the shaft 218 for rotation therewith. Again, a plurality of light emitting diodes 232 are provided with associated phototransistors 234 and operable to provide the four gating signals corresponding to those shown and described in connection with curves 186, 188, 190, and 192 in FIG. 4. Since the timing signals and optical aperture operation required of discs 230 and 184 are in a sequence which repeats at three times the rate of the color filter disc 186 and the associated timing disc 224, the shaft 218 may be rotated at a speed which is exactly three times the speed of the shaft 222. Another alternative is to provide three sets of apertures in the aperture disc 184. However, in a preferred embodiment of the invention, still a third arrangement is used in which the disc 184 is driven at one and one-half times the speed of the filter disc 186, and two separate sets of apertures are provided in the disc 184 to obtain an effective repetition rate of three times the rate of rotation of the filter disc 186. In that physical embodiment, the synchronous drive motor 36A rotates at 1800 revolutions per minute, the color filter disc rotates at 800 revolutions per minute, and the aperture disc 184 rotates at 1200 revolutions per minute. This provides a complete sampling and recalibration cycle, including sampling and recalibration for all three colors, in 75 milliseconds, the entire operation being repeated every 75 milliseconds. It will be recognized, of course, that other speeds of operation can be employed without departing from the principles of the present invention.

While it is not necessarily apparent from the timing diagram of FIG. 4, it is desirable to time the gating circuits of the system so as to be perfectly synchronized with the sixty Hz power supply so that when the system is dealing with light sources from which the light output varies during different phases of the power supply voltage wave, a consistent result is achieved. This problem may occur especially with light sources having variable current power controls which utilize only portions of the alternating voltage waveform. An alternative is to employ a sampling timing rate which is substantially higher than the power supply frequency. Thus, individual samples are randomly distributed with respect to light level variations due to the power supply waveform.

The embodiment of the invention shown and described in connection with FIGS. 3, 4, and 5 comprises a color photometer in which readings are continually repeated in each of the three colors, the results of the three color readings being stored on the capacitors 29R, 29G, and 29B. Thus, the three color readings are continuously and simultaneously available, even though the system is cycling and sampling to provide the three readings. Accordingly, the apparatus is accurately characterized as a simultaneous reading multiple color photometer. The apparatus shown and described in connection with FIGS. 3, 4, and 5 may be combined with a standard light source, and with voltage indicating devices to serve as a densitometer apparatus. However, the photometer, as described thus far, is designed to provide a higher voltage output for higher light inputs. When operating as a densitometer, lower readings are desired for higher light transmission (lower density). Accordingly, a voltage reversing network is required with each voltage-indicating device. A suitable arrangement for accomplishing this purpose is shown in FIG. 6.

Figure 6:
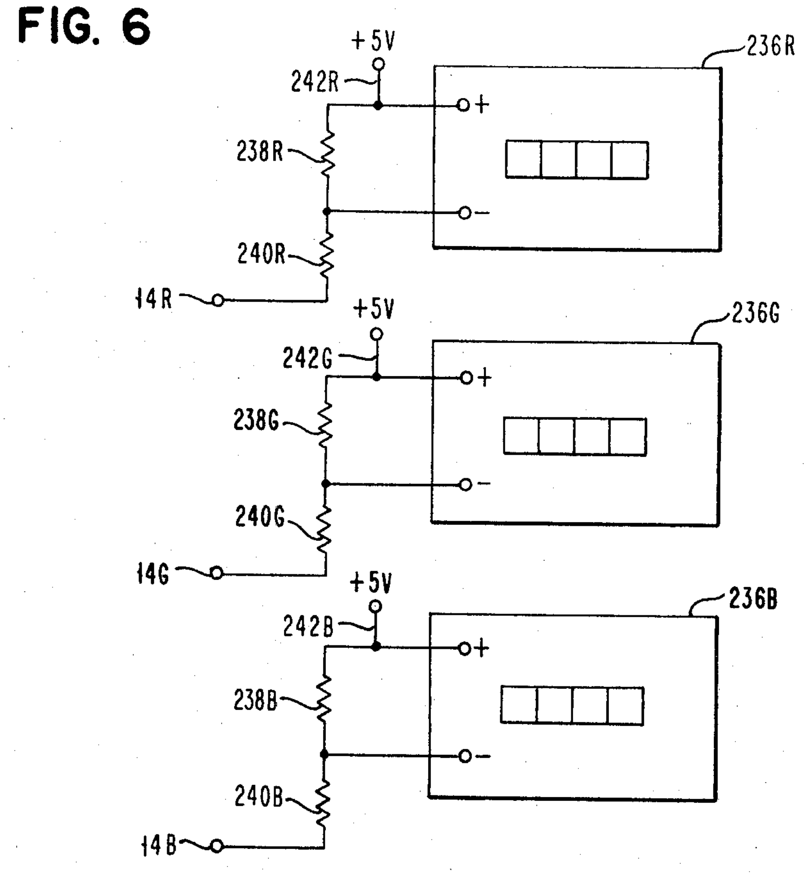
FIG. 6 illustrates a circuit which may be connected to the outputs of the circuit of FIG. 3 to form a combination circuit which is a direct reading three color densitometer.

FIG. 6 illustrates an arrangement of voltmeters and associated voltage divider and voltage inverter circuits which may be connected to the outputs of the circuit of FIG. 3 to provide a combination circuit operable as a three color simultaneous reading densitometer. In the circuit of FIG. 6, the output terminals 14R, G, and B of the FIG. 3 circuit are shown as the input terminals. Digital voltmeters 236R, G and B are provided for indicating the densitometer readings. A voltage dividing and voltage inverting network is provided as shown for each of the digital voltmeters. For instance, for voltmeter 236R, this consists of a combination of resistors 238R and 240R. The output circuits of the FIG. 3 embodiment are designed, in one preferred embodiment thereof, to provide output voltages which may vary over a range from −5 volts to +5 volts, with each 2.5 volt increment corresponding to a power-of-ten change in input illumination signal. In a densitometer, it is conventional and desirable to have the scale read in terms of a full digit one count for each power-of-ten increase in density. Accordingly, in order to employ a standard digital voltmeter for the voltmeter 236R the resistors 238R and 240R are selected to convert each 2.5 volt signal change increment to a 1 volt signal change as seen by the voltmeter. For this purpose, the resistors 238R and 240R are selected to have resistance values such that the 238R resistance represents forty percent of the total 238R and 240R resistance. Thus, for instance, the resistor 238R may be 4000 ohms and the resistor 240R may be 6000 ohms. Also, a fixed bias voltage of 5 volts is applied at terminal 242R to the positive terminal of digital voltmeter 236R and to the upper end of the voltage divider resistor 238R. With this arrangement, if there is a signal at terminal 14R of +5 volts, indicating maximum light transmission and minimum density, the reading on the digital voltmeter 236R will be zero. For each incremental decrease in voltage signal at terminal 14R of 2.5 volts, there will be an increase of one in the digital voltmeter reading as illustrated in the following table:

TABLE I

| Voltage at Terminal 14R | Digital Voltmeter Reading |
|---|---|
| +5.0 | 0.000 |
| +2.5 | 1.000 |
| 0 | 2.000 |
| −2.5 | 3.000 |
| −5.0 | 4.000 |

It will be understood that the above are sample values selected to illustrate the operation of the circuit. Normally the density readings will not fall on even numbered values, and decimal fractional increments will be indicated. The voltmeters 236G and B and associated voltage divider networks are identical in structure and operation to voltmeter 236R and the voltage divider network including resistors 238R and 240R.

One of the most important uses for a three color densitometer is for the purpose of photographic process control in which standard pre-exposed but undeveloped film strips are run through the user's photographic process and machine, and the resultant developed strip is compared by the densitometer with a standard predeveloped strip to determine whether the operating conditions of the process are correct. It is obviously important to maintain high standards of color processing performance because a tremendous investment is involved in the photographic materials being processed. Prior art color densitometers have been crude by comparison to the system just described, requiring several separate readings for each color, and involving serious shortcomings in accuracy. By contrast, the present apparatus provides immediate and simultaneous readings in all three colors, and with vastly improved accuracy and stability, providing repetitively consistent results.

If a direct reading photometer is desired, in which higher numbers indicate more light transmission, the circuits of FIG. 6 may simply be reversed and connected to a negative 5 volt reference voltage. The outer end of the resistor 238R is connected to the negative input terminal of the voltmeter and to −5 volts. The mid tap between resistor 238R and 240R is connected to the positive terminal of the voltmeter 236R. The readings are then simply reversed in sense.

FIG. 7 illustrates a circuit which may be connected to the output connections 14R, 14G, and 14B of FIG. 3 when the combined circuit is to serve as a precision color photometer, or as a precision color translator. The meaning of the term "color translator" will be more fully understood from the following explanation.

The red color photometer signal from terminal 14R is connected through resistor 244 to the inverting input of an operational amplifier 246. A feedback resistor 248 is connected from the output of amplifier 246 back to the inverting input thereof. Resistors 244 and 248 may preferably be substantially equal in magnitude, providing for a gain of one from the amplifier. At the connection 249, a series of calibrated resistors 250–259 are arranged to be connected by individual switches 260 to provide a controllable bias current from a standard reference positive voltage-current source indicated at terminal 262.

The amplifier 246 may be referred to as a red signal summing amplifier. The output from amplifier 246 is applied to a connection bus 264 where it is used as a comparison signal for three null balancing voltmeters 266, 268, and 270. The other signals to these respective voltmeters are supplied respectively from a green summing amplifier 272, a blue summing amplifier 274, and a so-called "density" summing amplifier 276. In the simplest form of the present circuit, in which the apparatus is used purely as a photometer, referred to herein as the "photometer version," the elements shown within the dotted boxes in the diagram at 278, 280, 282, 284, and 286 are omitted. The elements within the dotted boxes will be described below in connection with the color analyzer embodiment which employs those elements.

In the photometer version, the only input to the density summing amplifier 276 is from a standard source of positive voltage applied through a positive terminal and resistor 288 to the inverting input of amplifier 276. The resultant output of the density summing amplifier 276 to the null voltmeter 270 is such as to be balanced by the maximum useable value of red illumination which can be measured on the logarithmic scale and indicated by the output of the red summing amplifier 246 on the bus 264. As previously stated, the maximum value of the red illumination signal at terminal 14R within the logarithmic range in a particular preferred embodiment of the invention is +5 volts. Accordingly, the output from amplifier 276 should have a value of 5 volts to balance with the corresponding 5 volt output from amplifier 246. To accomplish this, with a regulated voltage of +7.5 volts applied to resistor 288, the value of that resistor is selected to be 30,000 ohms with a value for the feedback circuit resistor 289 for amplifier 276 of 20,000 ohms.

If the red illumination is less than the maximum value, (plus 5 volts in the preferred embodiment) the null meter 270 gives an appropriate off balance indication, and the deficiency of the illumination signal supplied at terminal 14R is balanced by providing appropriate currents through the resistors 250–259 by selectively closing one or more of the switches 260. The values of the resistors 250–259 are preferably selected to provide a binary digital calibration. Preferably, these resistors, and the associated switches, are arranged in sets of four to provide a binary coded decimal indication. Thus, the switches 260 associated with resistors 250, 251, 252, and 253 may be arranged with actuating cams, not shown, to provide for combinations of current values having a relationship of zero through 9 for correspondingly numbered rotational positions of a "units" actuating cam. Similarly, the resistors 254–257 are arranged to provide currents for the tens decade from 10 through 90 in response to the numbered positions of a "tens" actuating cam. To extend this scale into the third decimal powers, the resistors 258 and 259 provide for values 100 and 200 and are switched in by a "hundreds" actuating cam. The total count capacity of the current summing circuit, including all of the resistors 250–259 is therefore 399. This scale from zero to 399 on the cam switches 260 is intended to make use of the entire capacity of the photometer circuit of FIG. 3 in which there is a useable output range corresponding to a variation of the input signal over a range up to ten to the fourth power. This is sometimes referred to as four "decades." Thus, each unit on the cam switches 260 corresponds to one one-hundredth of a power of ten output. For accomplishing these purposes, typical values of the resistors 250–259 in a particular preferred embodiment are as given in the following table:

TABLE II

| Resistor Number | Resistance Value |
|---|---|
| 250 | 6.0 megohms |
| 251 | 3.0 megohms |
| 252 | 1.5 megohms |
| 253 | 750,000 ohms |
| 254 | 600,000 ohms |
| 255 | 300,000 ohms |
| 256 | 150,000 ohms |
| 257 | 75,000 ohms |
| 258 | 60,000 ohms |
| 259 | 30,000 ohms |

Thus, the arrangement of resistors 250–259 and associated switches 260 represents a binary coded decimal current source, with the magnitude of the currents being exactly selected and calibrated to be indicative of particular changes in the red photometer output signal at terminal 14R. The above resistance values are employed with a standard regulated voltage source connected at terminal 262 of +7.5 volts. Thus, the units circuit provided by resistor 250, when used alone, provides a current of 1.25 microamperes. Similarly, the tens circuit resistor 254, when used alone, provides a current of 12.5 microamperes, and the one-hundreds circuit resistor 258, when used alone, provides a current of 125 microamperes. Accordingly, the calibration of this circuit is 125 microamperes per decade of change of the output signal available on terminal 14R. In order to match this calibration of the combination of resistors 250–259 with the output voltage change at terminal 14R of 2.5 volts per decade, the resistor 244 preferably has a value of 20,000 ohms. Thus, a change of 2.5 volts at terminal 14R causes a change in the current through resistor 244 of 125 microamperes.

Accordingly, the numbers set into the switches 260 in order to provide a balance condition in the null balance voltmeter 270 give a precise indication of the amount of red illumination. A very high accuracy in the null measurement is obtainable by employing for the meter 270 a balancing voltmeter having a high sensitivity to low voltage differences. The voltmeter is protected until near balanced conditions are achieved by parallel connected diodes 290 which are respectively connected in opposite senses and which prevent the voltage differential across the meter 270 from exceeding rated overload values. Thus, the rating of the meter can be down in the order of the forward bias voltage ratings of the diodes.

The operation of the diodes 290 to avoid a voltage overload on meter 270 is further enhanced by the provision of a resistor 291 connected in series with the meter. Similar diode protection devices are connected in parallel with the meters 266 and 268 as indicated at 293 and 295.

The green summing amplifier 272 is provided with the green illumination intensity signal from terminal 14G through a resistor 292. Again, a feedback resistor is provided at 294 which is preferably equal in value to resistor 292 to provide a gain of one. The output of the green summing amplifier 272 is supplied to the null balancing voltmeter 266 for a comparison of the green signal with the red signal. Any imbalance condition may be adjusted by selective closure of switches 296 providing currents through calibrated resistors 298. These resistors are preferably calibrated in exactly the same manner as described above for resistors 250–259, and may have exactly corresponding resistance values. The settings of the switches 296 to achieve a balance of meter 266 then gives an indication of the intensity of the green illumination in relation to the red illumination. The circuits associated with the blue summing amplifier 274 are substantially identical to the circuits for the green summing amplifier 272 described just above. Thus, blue summing amplifier 274 receives the blue signals from terminal 14B of the FIG. 3 circuit, and those signals are supplied through resistor 300. Switches 308 are employed to switch in calibrated resistors 310 to balance the null voltmeter 268 to provide a direct and precise digital indication of the difference between the blue and the red illumination signals.

The signal applied to bus 264 by the red summing amplifier 246 is, by definition, a signal which is sufficient to balance the meter 270. Since the output from the density amplifier 276 has a fixed value, when the null meter 270 is balanced, the signal on bus 264 has a corresponding fixed value. This value serves as a signal against which the green and blue signals may be balanced in the null meters 266 and 268. The red must always be balanced first against the standard signal available from the amplifier 276. Therefore, in this photometer version, the null meter 270 may be referred to as the red balance meter. Since the green balance is obtained between the output of the green summing amplifier 272 and the balanced fixed standard bus 264, the meter 266 may be referred to as the green balance meter. Similarly, the meter 268 is the blue balance meter. A workable alternative arrangement is to energize the standard bus 264 directly from the so-called density amplifier 276, moving the meter 270 up into the output circuit of the red amplifier 246, between that amplifier and the bus 264. However, this alternative arrangement provides essentially the same result.

In this photometer version, it may be desirable to have the numbers on the calibrated resistor switches 260, 296, and 308 arranged to indicate higher numbers for higher amplitudes of color signals. For this purpose, the numbers on the cam actuators for the respective switches are simply applied in complete complement form. Thus, the numbers on the cams when in the positions of the cams for all of the switches to be opened would indicate the value 399. Moving the cams to positions which close the switches would reduce the numbers indicated on the cams. Thus, with all of the switches closed, the cam dials would read 000.

One of the most important purposes of this invention is to provide a color translator system for use with a color photographic printing machine. For this purpose, signals previously obtained from analysis of each color negative in other apparatus are employed for the purpose of determining the color filters required with the printer light source to compensate the color values of the photographic negative to produce a perfect positive color print. The previously determined relative color values are set into the present apparatus by operation of the respective red, green, and blue cam switches 260, 296, and 308. In general terms, the settings of these cam switches provide added currents at the inverting inputs of the color amplifiers 246, 272, and 274. These currents are compensated by inserting appropriate filters to intercept the light from the light source for the color printing machine to thereby appropriately reduce the individual color "photometer" signals at terminals 14R, 14G, and 14B.

In the color translator version of the invention, the apparatus within dotted box 284 is employed. This apparatus includes cam operated switches 312 and associated calibrated resistors 314. These components are similar to the cam operated switches 260 and calibrated resistors 250–259 previously described above. They are used for the purpose of inserting a "-density" signal into the system. The higher the density number set in the cam switches 312, the more of the associated resistors 314 there are which are connected into the circuit. And a high density number indicates the presence of a high density negative which requires more printing light. This can be obtained by increasing the lens aperture, increasing exposure time, or reducing filters, as described more fully below.

The data which is to be placed into the cam switches 260, 296, 310, and 312 should be obtained from a color negative analyzer. A preferred apparatus for carrying out this purpose may be constructed in accordance with the teachings of U.S. Pat. No. 3,351,707 issued Nov. 7, 1967 to Alex W. Dreyfoos, Jr. and George W. Mergens for an "Electronic Color Viewer," and assigned to the same assignee as the present application. In the commercial versions of this apparatus presently available, the user typically analyzes a color negative by placing the color negative in the machine and viewing a positive representation of the negative produced by the machine. The user then adjusts the density and the color values of the positive representation of the negative by adjustment of electrical machine circuits until a pleasing result is achieved. These adjustments are the equivalent of insertion of color filters, and the adjustments are in terms of digitized number values which correspond to the number values which are ultimately set into the cam switches 260, 296, 308, and 312 of the present invention.

In the printing machine, individual color filters are employed to control the intensity of the red, green and blue color components of illumination available to thereby satisfy the proper color balance. The red signal from amplifier 246 is adjusted by inserting or removing cyan filters (cyan is the complement of red) to allow either less or more of the red illumination to come through. The green signal from amplifier 272 is adjusted by inserting or removing magenta filters to reduce or increase the green illumination. Similarly, the blue light signal from amplifier 274 is adjusted by inserting or removing yellow filters to reduce or increase the blue light intensity component.

The preferred order of operations is to first center the null meters 266 and 268. For instance, the meter 266 is nulled by adjusting the combination of cyan and magenta filters associated with the red and green signals. The meter 268 is then nulled by adjusting the yellow filters (and the cyan filters if necessary). If the cyan filters are adjusted, then meter 266 must again be nulled by adjusting the magenta filters. The meter 270 may then finally be nulled by increasing or decreasing the lens aperture of the printing machine. When adjusting the above mentioned color filters, preference is given to reducing total filtration to a minimum. For instance, in adjusting the cyan and magenta filters for balancing null meter 266, if there is too much green signal in relation to the red signal, it is preferable to increase the red signal by reducing the cyan filtration rather than reducing the green signal by increasing the magenta filtration.

In the analyzer version of the circuit there is provided a circuit illustrated in the dotted box 286 which includes a connection from the inverting input of amplifier 276 through a resistor 316 to a multiple position variable resistance switch 318 having a rotatable switch arm 320 connected to a standard negative reference voltage source. By means of this circuit, a signal may be inserted into the system to compensate for different intervals of exposure to be used in the production of the print. When a longer exposure time is used, it is equivalent to opening the lens aperture. This is another adjustment which can be used to balance nullmeter 270. But the final adjustment is preferably made by the lens aperture.

When the maximum 120 second exposure is employed by use of the bottom left contact of the selector switch 318, a maximum negative current signal is available from the circuit 286 to the inverting input of amplifier 276. In a practical embodiment of the circuit, it has been found that useable exposure times extend from 5 seconds up to 120 seconds in convenient steps which may include, for example, a forty second exposure at the position of switch arm 320 shown in the drawing. In the practical operation of the translator, an attempt is typically made to balance the density versus red null meter 270 with the time compensation switch 318 set on the minimum exposure setting of 5 seconds. If the circuit calls for higher illumination signals than can be satisfied by opening the aperture, the exposure time resistor switch 318 is then adjusted to a longer exposure period. Electrically, this has the effect of reducing the density signal at amplifier 276, recognizing that more red signal effectively will be provided by the longer exposure time. The exposure time is increased by stepping switch arm 320 until the null meter 270 indicates that more than enough red signal will be available through the increase in exposure time. Then a "-fine" adjustment is obtained by stepping down the aperture to bring the meter 270 back to the null condition. The print is then made, using the exposure time set by switch arm 320.

In a preferred embodiment of the invention, the rotatable control shaft of the switch arm 320 is connected for rotation with other switches which set up an automatic exposure control timing circuit (not shown) which controls the operation of the printing light for the selected exposure period when the actual printing operation is initiated. The exposure control timing circuit may advantageously employ timing signals derived from the same timing means which provides the various gating signals described in connection with FIGS. 3 and 4 above.

In operation described above, if a higher member is set into the density cam switches 312, providing a higher current through the resistors 314 to the inverting input of amplifier 276, then a higher voltage output is available from amplifier 276. In order to balance this higher voltage, there must be a higher voltage output from the red amplifier 246. For a given setting of the cam switches 260, there must be a higher red light intensity signal from terminal 14R in order to provide this higher output voltage from amplifier 246. Accordingly, cyan filters must be removed from the system in order to allow more red illumination to come through to raise this red photometer output. This is the correct operation because a higher density number set in the cams 312 indicates that a generally higher level of illumination (less filtering) must be provided for proper printing of the positive picture from that particular negative. The higher output from amplifier 246 to bus 264 means that higher balancing outputs must be available from the green and blue amplifiers 272 and 274. This is accomplished by reducing the magenta filters and the yellow filters respectively. As explained above, the effect of higher color signals (less overall filtering) is also obtainable by increasing the exposure time or increasing the lens aperture.

Assuming a given density setting on the cam switches 312, a change to a higher red setting on the cam switches 260 means that a greater signal is available to the amplifier 246 from the currents through the resistors 250–259, and consequently the red color signal from terminal 14R must be reduced to achieve a balance at voltmeter 270. Accordingly, a higher number set in the cam switches 260 calls for the insertion of more cyan filters in the system to cut down on the red illumination signal coming through at terminal 14R. Conversely, a lower number in the cam switches 260 requires a reduction of the cyan filtering. By similar reasoning, a higher number in the green cam switches 296 calls for the addition of more magenta filtering to achieve a balance at meter 266. Also, a higher number in the blue cam switches 308 calls for the addition of yellow filtering to reduce the blue illumination signal to balance voltmeter 268. These adjustments provide the proper balance between green and red and blue and red respectively.

It has been discovered that there are individual variations in the color sensitivities of different color print papers. In order to compensate for these individual differences in color sensitivities, the emulsion trimming circuits illustrated in the dotted boxes 278, 280 and 282 are preferably provided. These circuits each include a potentiometer connected between standard positive and negative control voltages. The potentiometers can be adjusted to supply compensating currents to the inverting inputs of the amplifiers 272, 274 and 276. By this means, the operations of the circuit are modified to compensate for individual emulsion variations. The settings of these potentiometers may be calibrated to compensate for particular print papers so that the settings may be adjusted to predetermined desired set points whenever different printing paper is employed.

All of the cam switches 260, 296, 308 and 312 have been described as manually operated cam switches. However, in a practical embodiment of the invention it has been found to be quite advantageous to provide an alternative input signal from a punched paper tape reader, the tape reader providing similar control current signals automatically. In such an arrangement, the color negative analyzer is arranged to generate a punched paper tape containing the numerical information which would otherwise be read and manually set into the switches 260, 296, 308 and 312. By having the control current signals provided directly from a tape reader, it is unnecessary for a human operator to read and record numbers from the analyzer and to again read and set those numbers into the cam switches. The result is that the operation is much faster and is not subject to human error in transcribing and setting numbers.

The circuit of FIG. 3 has a true logarithmic output function over a range corresponding to four powers of ten. As previously discussed above, in a preferred embodiment of the invention, this range corresponds to a range of output voltages on each of the terminals 14R, 14G, and 14B from −5 volts to +5 volts, each increment of 2.5 volts corresponding to a power of 10 change. If the input signals are such as to fall outside of the true logarithmic range of the circuit, it is very desirable that the operator should be warned of this condition since the accurate operation of the apparatus depends upon remaining within the true logarithmic range. This is particularly important when the FIG. 7 circuit is employed as the output circuit of the system because the voltages may be balanced in the circuit of FIG. 7 even though they may be outside of the logarithmic range. Accordingly, an out of range alarm circuit is provided as illustrated schematically in FIG. 8.

FIG. 8 illustrates a circuit which is preferably connected as an auxiliary circuit to the output terminals 14R, 14G, and 14B of the circuit of FIG. 3. A high voltage condition indicating operation outside the logarithmic range on any one of the terminals 14R, G, or B is determined through respective isolating diodes 322, 324, and 326 by a high voltage limit circuit 328. By means of a simple voltage comparison with a standard regulated reference voltage indicated at terminal 330, the high voltage limit circuit detects the condition in which any one of the color signals from terminals 14R, G, or B, exceed a rated voltage such as +5 volts. If this condition is reached, an output signal is supplied from the high voltage limit circuit on connection 332 to an alarm device 334. The alarm device 334 may consist of a visible signal device such as an indicator lamp, or an audible signal device such as a bell or a small speaker provided with audio oscillations from an oscillator. If the alarm is energized, the operator has the opportunity to adjust the apparatus to bring it back into the true logarithmic range in order to obtain the desired accuracy. Similarly, low voltage outputs at, for instance, below −5 volts, at terminals 14R, G, and B indicating operation outside of the true logarithmic range are detected through isolation diodes 336, 338, and 340 by a low voltage limit circuit 342. The low voltage limit circuit 342 is again a simple voltage comparison circuit operating on the basis of a regulated standard regulated reference voltage indicated at terminal 344 and operable to provide an alarm output signal at 346 when the low voltage condition is detected. Thus, with the arrangement shown, a single alarm is employed to indicate to the operator that the apparatus is out of the desired operating range. Separate alarms may be employed, if desired, to indicate whether the output voltage is too high or too low.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A circuit operable to provide an output signal which is an accurate logarithmic function of an input signal despite fluctuations in conditions of operation comprising an electrical device capable of providing an intermediate output signal which is a logarithmic function of an input signal and which is subject to modification in response to variations in at least one condition of operation, means operable in timed sequence to repeatedly present first and second different known standard input signals and an unknown input signal to said electrical device, a first amplifier connected to receive the intermediate output signals from said electrical device to amplify said logarithmic function intermediate output signals to produce output signals, means connected to receive the output of said first amplifier in response to said first standard input signal and operable for adjusting a bias on the input of said first amplifier in accordance therewith, means connected to receive the output of said first amplifier in response to said second standard input signal and operable for adjusting the gain of said first amplifier in accordance therewith, said bias adjusting means and said gain adjusting means being effective to compensate the operation of the combination of said electrical device and said first amplifier to provide a true logarithmic function output signal in response to the unknown input signal within the effective logarithmic function input signal range of said electrical device despite variations in said conditions of operation.

2. A circuit as claimed in claim 1 wherein said electrical device comprises a semiconductor device having at least two terminals.

3. A circuit as claimed in claim 2 wherein said semiconductor device comprises a diode.

4. A circuit as claimed in claim 3 wherein said diode is a silicon diode.

5. A circuit as claimed in claim 3 where in said diode is a simple diode.

6. A circuit as claimed in claim 3 wherein said diode is a transdiode.

7. A circuit as claimed in claim 6 wherein said transdiode comprises a silicon transistor.

8. A circuit as claimed in claim 2 wherein said input signal is manifested by a current and said intermediate output signal is a voltage signal, said current manifesting said input signal being a current at one terminal of said semiconductor device and said intermediate output voltage signal comprising a voltage across two terminals of said semiconductor device accompanying said current.

9. A circuit as claimed in claim 8 wherein said electrical device comprises an operational amplifier in combination with said semiconductor device, said device operational amplifier having the output terminal thereof connected to one of said output terminals of said semiconductor device and having the inverting input terminal thereof connected to said input terminal of said semiconductor device such that said device operational amplifier is caused to provide an intermediate output voltage sufficient to control the current between said semiconductor device and said inverting input of said device operational amplifier such as to maintain the current through said inverting input at substantially zero value.

10. A circuit as claimed in claim 9 wherein said means operable in timed sequence includes means to present a zero level input signal to the combination of said device and said device operational amplifier at predetermined intervals and operable during said predetermined intervals to connect the output of said device operational amplifier to supply a zero input bias current to said device operational amplifier.

11. A circuit as claimed in claim 9 wherein said semiconductor device comprises a silicon transistor, said transistor having a ground connection to the base thereof, said input signal terminal of said device comprising the collector terminal of said transistor, and said output terminal of said device connected to said output terminal of said device operational amplifier comprising the emitter terminal of said transistor.

12. A circuit as claimed in claim 1 wherein said bias adjusting means comprises a storage means operable to receive the output of said first amplifier in response to said first standard input signal and operable to store said output for maintenance of the adjusted bias on the input of said first amplifier after the interruption of said first standard input signal, and wherein said gain adjusting means comprises a storage means operable to receive the output of said first amplifier in response to said second standard input signal and operable to store said output for maintenance of the adjusted gain of said first amplifier after the interruption of said second standard input signal.

13. A circuit as claimed in claim 12 wherein said outputs of said first amplifier in response to said first and second standard input signals are voltages and wherein said storage means comprising said bias adjusting means and said storage means comprising said gain adjusting means are capacitors for storage of said voltages.

14. A circuit as claimed in claim 13 wherein said first amplifier comprises an operational amplifier connected in the non-inverting mode with a gain determining voltage divider network connected across the output thereof and having a portion of the voltage from said voltage divider network connected to the inverting input of the operational amplifier.

15. A circuit as claimed in claim 14 wherein said bias adjusting means comprises a second operational amplifier having the non-inverting input thereof connected to said bias adjusting means storage means and having the output thereof coupled to the inverting input of said first amplifier for adjusting the bias thereon.

16. A circuit as claimed in claim 15 wherein said gain adjusting means comprises a third operational amplifier having an input thereof connected to said gain adjusting means storage means and having the output thereof coupled to said voltage divider network of said first amplifier to adjust the effective impedance of at least one network circuit element to thereby adjust the gain of said first amplifier.

17. A circuit as claimed in claim 16 wherein the coupling of said gain adjusting means amplifier load circuit and said first amplifier impedance is carried out by an optical coupling, the load circuit of said third operational amplifier comprising an electrically energized light source, said adjustable impedance voltage divider network element comprising a photoconductor device, said photoconductor device being positioned to receive illumination from said electrically energized illuminating device to thereby establish an optical coupling for reduction of the resistance of said photoconductor device is response to receipt of such illumination.

18. A circuit as claimed in claim 17 wherein said light source comprises a light emitting diode.

19. A circuit as claimed in claim 1 wherein said means operable in timed sequence is operable to connect said bias adjusting means to receive the output of said first amplifier only at the time of presentation of said first known standard input signal to said electrical device, said means operable in timed sequence also being operable to connect said gain adjusting means to receive the output of said first amplifier only at the time of presentation of said second known standard input signal to said electrical device.

20. A circuit as claimed in claim 16 wherein there is provided an output circuit means connected to receive signals from said first amplifier in response to an unknown input signal to said electrical device, said output circuit means comprising at least one capacitor for storing the output signal resulting from said unknown input signal.

21. A circuit as claimed in claim 20 wherein there is provided a variable time constant circuit connected to the output of said first amplifier to transmit signals from said first amplifier to said bias adjusting means and said gain adjusting means and said output means, said variable time constant circuit comprising at least one non-linear circuit element having a high impedance when a low voltage is applied thereto, and having a low impedance when a voltage above a predetermined threshold is applied thereto.

22. A circuit as claimed in claim 8 wherein said circuit is operable as a photometer to receive said first and second different known standard input signals and said unknown input signal in the form of optical illumination signals, said electrical device comprising a light-sensitive element operable to receive said illumination signals and operable to provide said current signals manifesting said input signals.

23. A circuit ac claimed in claim 22 wherein said light-sensitive element is a photomultiplier tube connected to said semiconductor device to provide the current therein.

24. A circuit as claimed in claim 22 wherein said circuit is operable as a multiple color photometer to receive said first and second different known standard input signals and said unknown input signals in the form of optical illumination signals in a plurality of separate colors, said bias adjusting means comprising a separate storage means operable to receive the output of said first amplifier respectively in response to each of said different color first standard input signals, said bias adjusting means storage means each being operable to store said output for maintenance of the adjusted bias on the input of said first amplifier after the interruption of said first standard input signal for the associated color and during operation of said first amplifier in response to said second standard input signal and said unknown input signal for that same color, said gain adjusting means comprising a separate storage means operable to receive the output of said first amplifier in response to each of said different color second standard input signals, said gain adjusting means storage means each being operable to store said output for maintenance of the adjusted gain of said first amplifier after the interruption of said second standard input signal for the associated color and during operation of said first amplifier in response to said first standard input signal and said unknown input signal for that same color.

25. A circuit as claimed in claim 24 wherein there is provided a multiple color filter device physically movable to repeatedly interpose individual color filters in the path of all of the illumination signals directed to said light sensitive element to thereby limit the signals to particular color values.

26. A circuit as claimed in claim 25 wherein said physically movable filter device comprises a rotatable disc, and wherein there is provided at least one optical timing device rotatable in synchronism with said filter disc and including optical apertures arranged with individual light sources and photoresponsive electrical devices for providing timed switching signals for establishing the timed sequence for presentation of said first and second different known standard input signals and said unknown input signals for each of the different colors.

27. A circuit as claimed in claim 25 wherein there is provided a single standard source of illumination operable to provide both of said known standard input signals for all of said colors, the illumination from said source being directed to a partially reflective optical device from which the reflected optical signal is used for one of said different known standard input signals and from which the transmitted optical signal provides the other one of said standard optical input signals.

28. A circuit as claimed in claim 27 wherein said standard signal source comprises a filament lamp operated at a voltage substantially below the rated lamp voltage.

29. A circuit as claimed in claim 24 including separate output circuits for each of said colors respectively connectable to receive the output signals from said first amplifier during the intervals of receipt of unknown signals in said respective colors by said electrical device, said color unknown output circuits each comprising a storage device.

30. A circuit as claimed in claim 29 wherein said color unknown output circuit storage devices are comprised of capacitors.

31. A circuit as claimed in claim 29 including a separate digital voltmeter coupled to each of said color unknown output circuits for directly indicating logarithmic function representations of the magnitudes of the unknown illumination signals.

32. A circuit as claimed in claim 31 wherein each digital voltmeter is coupled to the associated color unknown output circuit by means of a voltage subtraction network to provide output voltmeter readings in terms of color density numbers in which each density number reading is an inverse function of the amount of illumination detected.

33. A circuit as claimed in claim 29 wherein there is provided a density signal voltage source, a first null voltage balance indicating device coupled to receive the voltage from said density voltage source, means for coupling a first color output from a first one of said color unknown output circuits to the other side of said first null voltage device, a first calibrated adjustable signal source connected and arranged to add a calibrated signal value to said first color output to balance said first null voltage device, the setting of said first calibrated adjustable signal source thereby providing a measure of the value of said first color output, a second null voltage balance indicating device coupled to receive the balanced sum of said first color output and the calibrated signal value from said first calibrated adjustable signal source, means for coupling a second color output from a second one of said color unknown output circuits to the other side of said second null voltage device, a second calibrated adjustable signal source connected and arranged to add a calibrated signal value to said second color output to balance said second null voltage device, the setting of said second calibrated adjustable signal source thereby providing a measure of the value of said second color output relative to said balanced sum.

34. A circuit as claimed in claim 33 wherein there is provided a third null voltage balance indicating device coupled to receive said balanced sum, means for coupling a third color output from a third one of said color unknown output circuits to the other side of said third null voltage device, a third calibrated adjustable signal source connected and arranged to add a calibrated signal value to said third color output to balance said third null voltage device, the setting of said third calibrated adjustable signal source thereby providing a measure of the value of said third color output relative to said balanced sum.

35. A circuit as claimed in claim 34 wherein said density signal voltage source comprises a fourth calibrated adjustable signal source operable to provide a calibrated density signal value.

36. A circuit as claimed in claim 35 wherein said circuit is adapted to function as a color translator operable to receive color exposure data previously obtained from a color analyzer, said data being set into said first through fourth calibrated adjustable signal sources to indicated required color and density values in a color printer, said circuit including an exposure time compensation circuit connected to said fourth calibrated adjustable signal source for reducing the density signal to compensate for increases in exposure time.

37. A multiple color value measurement and indicating circuit comprising means for simultaneously measuring illumination in a plurality of different colors and operable to provide a plurality of color signal outputs respectively from a plurality of color unknown output circuits.

a density signal voltage source, a first null voltage balance indicating device coupled to receive the voltage from said density voltage source, means for coupling a first color output from a first one of said color unknown output circuits to the other side of said first null voltage device, a first calibrated adjustable signal source connected and arranged to add a calibrated signal value to said first color output to balance said first null voltage device, the setting of said first calibrated adjustable signal source thereby providing a measure of the value of said first color output, a second null voltage balance indicating device coupled to receive the balanced sum of said first color output and the calibrated signal value from said first calibrated adjustable signal source, means for coupling a second color output from a second one of said color unknown output circuits to the other side of said second null voltage device, a second calibrated adjustable signal source connected and arranged to add a calibrated signal value to said second color output to balance said second null voltage device, the setting of said second calibrated adjustable signal source thereby providing a measure of the value of said second color output relative to said balanced sum, a third null voltage balance indicating device coupled to receive said balanced sum, means for coupling a third color output from a third one of said color unknown output circuits to the other side of said third null voltage device, a third calibrated adjustable signal source connected and arranged to add a calibrated signal value to said third color output to balance said third null voltage device, the setting of said third calibrated adjustable signal source thereby providing a measure of the value of said third color output relative to said balanced sum, said density signal voltage source comprising a fourth calibrated adjustable signal source operable to provide a calibrated density signal value, each of said calibrated adjustable signal sources comprising a plurality of current sources interrelated to form a binary decimal coded combination for representation of numbers by electrical currents having a binary decimal coded relationship to the numbers represented.

38. A circuit as claimed in claim 37 wherein the coupling of said density voltage source to said first null voltage device and said separate coupling means for each of said first, second, and third color outputs all comprise operational amplifiers.

39. A circuit as claimed in claim 29 wherein there is provided a high voltage limit circuit connected through separate isolating diodes to all of said unknown color output circuits and operable to detect a high voltage condition indicating operation of any one of said circuits at a voltage level indicating operation of said electrical device outside of the true logarithmic range thereof, said circuit also including a low voltage limit circuit connected through separate isolating diodes to all of said unknown color output circuits and operable to detect a low voltage condition indicating operation of any one of said circuits at a voltage level indicating operation of said electrical device outside of the true logarithmic range thereof, and at least one alarm device connected to provide an alarm signal whenever said high voltage limit circuit or said low voltage limit circuit is operable to indicate operation of said electrical device outside of the true logarithmic range thereof.

* * * * *